United States Patent
Fan et al.

(10) Patent No.: US 10,193,191 B2
(45) Date of Patent: Jan. 29, 2019

(54) ELECTRICAL SYSTEM WITH BATTERY MODULE AND COVER ASSEMBLY PROVIDING BUILT-IN CIRCUIT PROTECTION

(71) Applicant: GM GLOBAL TECHNOLOGY OPERATIONS LLC, Detroit, MI (US)

(72) Inventors: Yue Fan, Troy, MI (US); Charanjit S. Chawa, Sterling Heights, MI (US); Pinakin Naik, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/618,543

(22) Filed: Jun. 9, 2017

(65) Prior Publication Data

US 2018/0358660 A1    Dec. 13, 2018

(51) Int. Cl.

| | |
|---|---|
| *H01M 10/653* | (2014.01) |
| *H01M 10/42* | (2006.01) |
| *H02P 27/06* | (2006.01) |
| *B60L 11/18* | (2006.01) |
| *H01R 4/48* | (2006.01) |
| *H01R 11/28* | (2006.01) |
| *H01M 2/10* | (2006.01) |
| *H01M 2/20* | (2006.01) |
| *H01M 10/0525* | (2010.01) |
| *H01M 10/48* | (2006.01) |

(52) U.S. Cl.
CPC ....... *H01M 10/425* (2013.01); *B60L 11/1803* (2013.01); *H01M 2/1077* (2013.01); *H01M 2/206* (2013.01); *H01M 10/0525* (2013.01); *H01M 10/486* (2013.01); *H01R 4/4845* (2013.01); *H01R 11/282* (2013.01); *H02P 27/06* (2013.01); *H01M 2010/4271* (2013.01); *H01M 2220/20* (2013.01)

(58) Field of Classification Search
CPC ..................................................... H01M 10/425
See application file for complete search history.

(56) References Cited

U.S. PATENT DOCUMENTS

| 2009/0139781 | A1* | 6/2009 | Straubel | B60L 11/1875 180/65.1 |
|---|---|---|---|---|
| 2015/0037649 | A1* | 2/2015 | Wyatt | H01M 10/625 429/120 |
| 2017/0012331 | A1* | 1/2017 | Ng | H01M 2/105 |

* cited by examiner

*Primary Examiner* — Muhammad S Islam
(74) *Attorney, Agent, or Firm* — Quinn IP Law

(57) ABSTRACT

A battery module includes a pack section and a cover assembly. The pack section has an interconnect board, conductive channels, and battery cells extending through the interconnect board. Each battery cell includes electrode cell tabs joined to a corresponding conductive channel. The cover assembly is connectable to the pack section, and has conductive interconnect members, electrical fuses, and sense lines built into or integral with a cover plate. The interconnect members extend from the cover plate and form part of an electrical circuit between the conductive channels of the pack section and the fuses and sense lines of the cover plate when the cover assembly is connected to the pack section. An electrical system includes the battery module, a DC voltage bus, and at least one high-voltage component connected to the battery module via the DC voltage bus. The electrical system may be part of a motor vehicle.

20 Claims, 4 Drawing Sheets

ELECTRICAL SYSTEM WITH BATTERY MODULE AND COVER ASSEMBLY PROVIDING BUILT-IN CIRCUIT PROTECTION

INTRODUCTION

Electric powertrains typically use one or more electric machines to selectively impart an input torque to a transmission and generate electricity in different powertrain operating modes. Electrical energy required for powering the electric machines or other high-voltage components is stored in a rechargeable energy storage system (RESS), i.e., a battery module and associated contactors and fuses. The battery module in turn may include multiple interconnected lithium ion battery cells arranged into packs or pack sections. Electrode extensions of the individual battery cells are then joined to a conductive channel to provide series and parallel electrical connections between the various battery cells and multiple battery packs.

A controller is used to regulate operation of a battery module. To this end, the individual cell voltages of the various battery cells are periodically measured using individual sense lines of a flex circuit or printed circuit board assembly. The cell voltages are reported to the controller, which then uses the reported cell voltages to control the amount of electrical energy flowing to and from the RESS, as well as to monitor the overall health of the battery pack and perform cell voltage balancing and thermal regulation functions. As a precaution, small low-voltage sense line fuses are soldered into and permanently potted to the sense lines to help protect against an overvoltage or overcurrent condition.

Sense line fuses typically have a high level of series reliability. However, such fuses are typically quite small, e.g., no more than 6 mm×3 mm×3 mm. Moreover, the diminutive fuses are soldered to the conductive traces forming the individual sense lines in a battery module-mounted flexible circuit board ("flex circuit") or rigid printed circuit board assembly (PCBA), which in turn are riveted to a rigid interconnect board of the battery module. The soldered fuses are thereafter permanently potted into place on the flex circuit or PCBA, e.g., using a thick layer of epoxy.

SUMMARY

A battery module is disclosed herein that may be used in an electrical system. By way of example and not limitation, the electrical system may be part of a battery electric, extended-range electric, or hybrid electric vehicle, or other mobile platform, or for stationary electrical systems such as a power plant. The battery module includes a cover assembly providing integrated/built-in sense line protection for the various battery cells of a given pack section of the battery module.

As described below with reference to the various Figures, the disclosed cover assembly is serviceable or replaceable in response to a sense line fuse failure, and thus avoids the need for battery module or pack section replacement. The present approach embeds sense line fuses and traces inside of the structure of the cover assembly, and solves a potential problem with the above-described configurations in which individual potted fuses are not easily replaced or serviced. A possible result of such existing construction is that the battery module or a pack section thereof is removed and replaced in response to a fuse failure.

In contrast, the present approach instead provides an integrated approach to low-voltage fuse-based sense line circuit protection, particularly in electrical systems utilizing multi-cell high-voltage battery modules. The pack section in an example embodiment includes a plurality of battery cells each having a set of electrode tabs. The cover assembly includes a cover plate and a plurality of conductive interconnect members, as well as sense line fuses and circuit traces forming the individual sense lines noted above. The fuses and sense lines are built into or integrally formed with the cover assembly, while the conductive interconnect members form part of a conductive circuit between the conductive channels, the fuses, and the sense lines when the cover assembly is connected to the pack section.

In a particular embodiment, the battery module includes a pack section and a cover assembly. The pack section has an interconnect board, a plurality of conductive channels, and a plurality of battery cells extending through the interconnect board. Each of the battery cells includes at least one electrode cell tab that is joined to a corresponding one of the conductive channels. The cover assembly is connectable to the pack section, and has a cover plate and conductive interconnect members, electrical fuses, and sense lines built into or integral with the cover plate. The conductive interconnect members extend from the cover plate and form part of an electrical circuit between the conductive channels of the pack section and the fuses and sense lines of the cover plate when the cover assembly is connected to the pack section.

The conductive interconnect member may be variously embodied as a coil spring, a leaf spring, or an electrical connector having a clamping end and a crimping end.

When embodied as the coil spring, the interconnect member may have a distal end forming a coil loop, with the conductive channels optionally defining a surface feature that aligns and mates with the coil loop.

When embodied as the leaf spring, the interconnect member may include a surface feature that contacts a surface of the conductive channel when the cover assembly is connected to the pack section.

The cover assembly may include a multi-pin electrical connector forming a terminal end of the sense lines.

The fuses in some embodiments may have a current rating in a range of about 100 milliamps to 5 amps An electrical system is also disclosed that includes the battery module, a direct current (DC) voltage bus, and at least one high-voltage component connected to the battery module via the DC voltage bus. The high-voltage components may include a power inverter module, with the electrical system including an electric machine connected to the battery module via the power inverter module.

The electrical system may be connected to a transmission with an input member connected to the electric machine, and an output member connected to a load. For instance, the electrical system may be part of a vehicle having road wheels as the load, with the output member being connected to the road wheels.

The above features and advantages and other features and advantages of the present disclosure are readily apparent from the following detailed description of the best modes for carrying out the disclosure when taken in connection with the accompanying drawings.

Figure 1:
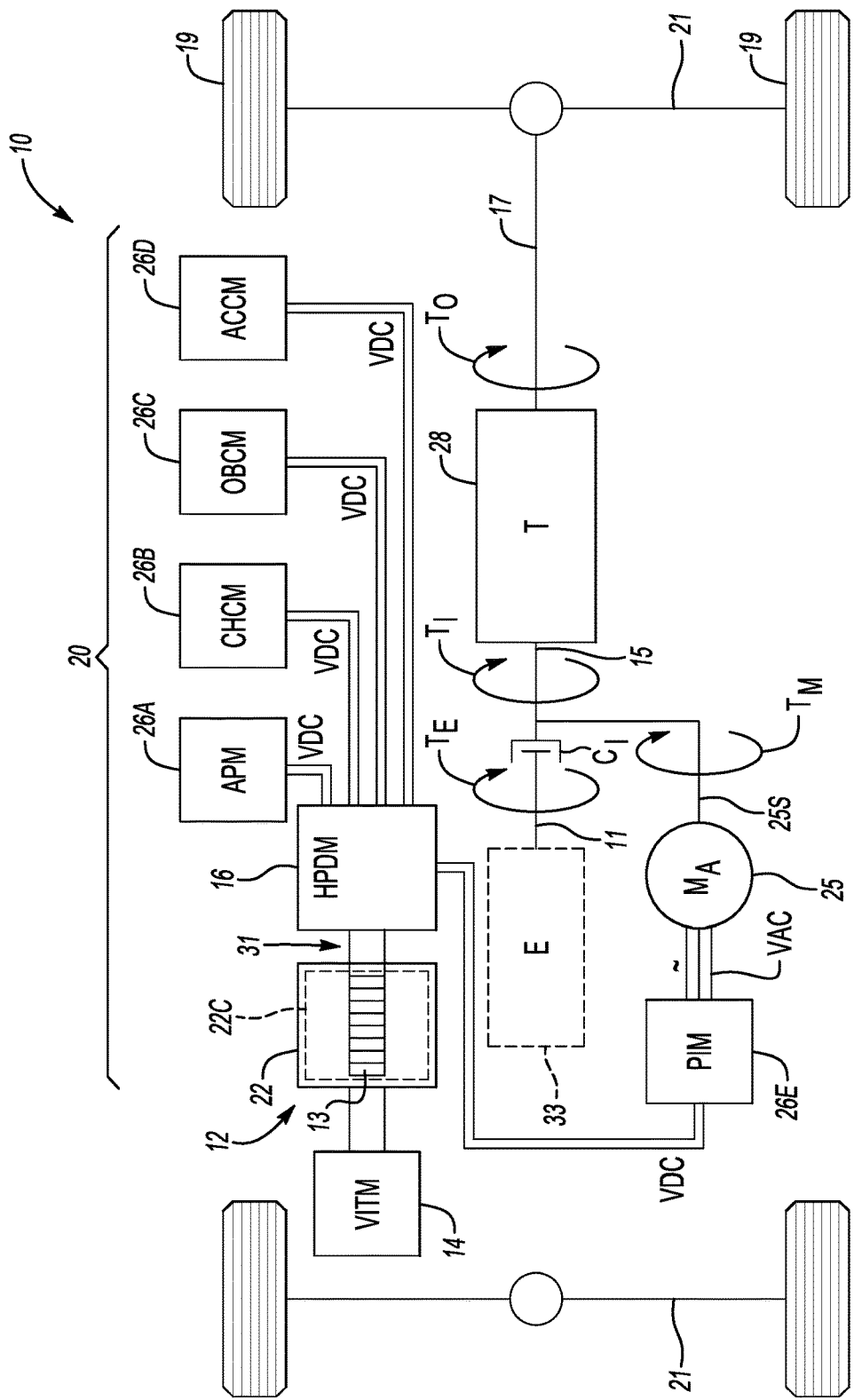
FIG. 1 is a schematic illustration of an example electrical system having a battery module with a cover assembly providing integral sense line circuit protection as disclosed herein.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the drawings. Rather, the disclosure is to cover all modifications, equivalents, permutations, combinations, sub-combinations, and alternatives falling within the spirit and scope of the disclosure as defined by the appended claims.

DETAILED DESCRIPTION

Referring to the drawings, wherein like reference numbers correspond to like or similar components throughout the several figures, an example vehicle 10 and electrical system 20 are schematically depicted in FIG. 1. The vehicle 10 may be alternatively configured as a battery electric vehicle, an extended-range electric vehicle, a hybrid electric vehicle, or other vehicle 10 having an electric powertrain. Although a vehicular application is shown, the electrical system 20 may be used in other mobile platforms, power plants, or other stationary systems having a rechargeable battery module 12 configured to store or provide electrical power.

The battery module 12 includes a pack section 22 and a mating cover assembly 22C, with the cover assembly 22C providing the pack section 22 with integral or built-in circuit protection as described in detail below with particular reference to FIG. 2. The pack section 22 includes a plurality of battery cells 13, e.g., lithium ion battery cells or battery cells having suitable battery chemistry. A number of pack sections 22 having the same number or a different number of the battery cells 13 may be connected together in series and/or in parallel to collectively supply direct current (DC) high-voltage levels about 50 volts DC (VDC) to 450 VDC or more depending on the application and power requirements. Therefore, the term "high-voltage" as used herein refers to voltages in excess of typical 12-15 VDC auxiliary voltage levels.

The battery module 12 may be electrically connected to a high-power distribution module (HPDM) 16, e.g., an electrical junction box, to distribute electricity from the battery module 12 to a variety of high-voltage components 26A-E via a DC voltage bus 31. In the non-limiting example configuration depicted in FIG. 1, the high-voltage components 26A, 26B, and 26C may include an auxiliary power module (APM), a cabin heater control module (CHCM), and an onboard charging module (OBCM), respectively. As is known in the art, the term "APM" refers to a voltage converter configured to increase or decrease a DC voltage output of the battery module 12. A CHCM is a device operable for heating a passenger cabin of the vehicle 10, while an OBCM is a device commonly used to charge the battery module 22 when needed. High-voltage component 26D may be an air conditioning control module (ACCM), i.e., a device operable for cooling the passenger cabin and/or other components of the vehicle 10. High-voltage component 26E may be embodied as a power inverter module (PIM) as shown, which as known in the art is operable for inverting a DC voltage (VDC) from the battery module 22 into an AC voltage (VAC).

The vehicle 10 of FIG. 1 may be powered in certain operating modes solely using electrical energy supplied by the battery module 22, with such operating modes referred to as electric vehicle or "EV" modes. To this end, the vehicle 10 may include one or more electric machines 25 ($M_A$), e.g., an electric traction motor providing motor output torque (arrow $T_M$) via a motor output shaft 25S. The motor output torque (arrow $T_M$) may form some or all of an input torque (arrow $T_I$) supplied to an input member 15 of a transmission (T) 28, for instance a gear box having one or more planetary gear sets (not shown), a direct drive or 1:1 gear ratio transmission, or a continuously-variable transmission.

An optional internal combustion engine (E) 33 may be used to selectively generate engine torque (arrow $T_E$) via a crankshaft 11. The crankshaft 11 may be selectively connected to the input member 15 via engagement of an input clutch $C_I$. An output member 17 of the transmission 28 ultimately transmits a transmission output torque (arrow $T_O$) to one or more drive axles 21, and thus to a set of road wheels 19 in the non-limiting vehicular embodiment of FIG. 1 or to another load in non-vehicular embodiments. Thus, the engine torque (arrow $T_E$) and motor output torque (arrow $T_M$) may combine to form the input torque (arrow $T_I$) to the transmission 28 in some modes in a non-limiting hybrid electric vehicle embodiment.

The battery module 12 of FIG. 1 includes the pack section 22 and the mating cover assembly 22C as noted above. Both the pack section 22 and the cover assembly 22C are shown in schematic plan view in FIG. 2. The cover assembly 22C provides the pack section 22 with integral/built-in circuit protection by incorporating protective electrical circuitry. The disclosed structure allows the cover assembly 22C to be removed and repaired or discarded in lieu of repair or replacement of the pack section 22 or the battery module 12, thereby expediting repair operations and potentially reducing repair costs associated with the battery module 12.

In particular, the pack section 22 includes an interconnect board 30 and a plurality of the battery cells 13 (see FIG. 1), with the battery cells 13 disposed behind and below the interconnect board 30. The interconnect board 30 may be constructed of a solid flat piece of molded plastic in certain embodiments, such that the interconnect board 30 provides structural rigidity to the pack section 22. As is known in the art, each of the battery cells 13 may include a main cell body (not shown) having positive and negative current collectors, e.g., constructed of aluminum and copper, respectively, separated by an electrolyte solution, and enclosed in a foil pouch or other suitable construction. A portion of the current collectors protrudes from the main cell body as electrode cell tabs 13E, which extend orthogonally through the interconnect board 30.

The individual cell tabs 13E may be ultrasonically welded or otherwise joined to a conductive channel 14, e.g., an elongated U-shaped or L-shaped copper bus bar, to electrically interconnect the various battery cells 13. In the illustrated U-shaped bus bar embodiment of FIG. 3, for instance, the conductive channel 14 includes a floor 14F flanked by a pair of side walls 14W. While shown in simplified schematic form in FIG. 2, a set of three or more such cell tabs 13E may protrude through interconnect board 30 on opposite sides of the conductive channel 14 when a U-shaped conductive channel 14 is used, or on one side of the conductive channel 14 as shown when an L-shaped conductive channel 14 is used.

The cover assembly 22C includes a cover plate 40 and a plurality of interconnect members 50, as well as a corresponding plurality of sense lines 42 and sense line fuses 46. The fuses 46 may be embodied as small electrical fuses rated for about 100 milliamps to 5 amps, and having a small envelope, e.g., of about 50 mm$^3$ or less. The sense lines 42 and fuses 46 may be built into/integral with the structure of the cover plate 40, such as using an over-molding process, or by mounting the sense lines 42 and fuses 46 to a surface 40S of the cover plate 40. Each of the interconnect members 50 extending outwardly from the surface 40S corresponds to a given one of the conductive channels 14 of the pack section 22, such that when the cover assembly 22C is connected to the pack section 22, the cover assembly 22C forms part of an electrical circuit with the individual battery cells 13.

The sense lines 42 may be electrically connected to a multi-pin electrical connector 35 forming a terminal end of the various sense lines 42. The connector 35 in turn may connect to an external controller (C) 80, e.g., a voltage-current-temperature module (VITM) operable for monitoring the pack section 22, balancing the charge and/or individual cell voltages of the battery cells 13, and regulating power flow to and from the pack section 22. Alternatively, the connector 35 may be replaced with an integrated circuit or sense chip performing functions of the VITM, in which case the controller 80 may be omitted, or at least configured to perform fewer functions.

Figure 3:
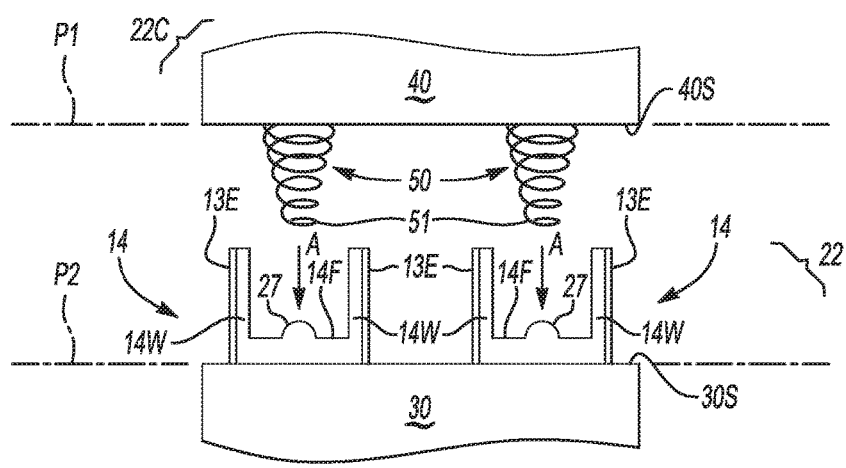
FIG. 3 is a schematic side-view illustration of the cover assembly and pack section of FIG. 2.

As best shown in FIG. 3, the conductive interconnect members 50 protrude orthogonally outward from the surface 40S of the cover plate 40 such that, when the cover assembly 22C is ultimately clamped to the pack section 22, the interconnect members 50 are brought into direct contact with a corresponding one of the conductive channels 14. The interconnect members 50 may be guided into place using alignment dowels (not shown) or other alignment features, with the interconnect members 50 possibly providing a normal force to ensure good electrical connection with the corresponding conductive channels 14. Similarly, the interconnect members 50 may be configured with sufficient amount of resiliency so as to absorb some relative motion of the cover assembly 22C to the pack section 22.

By way of example and not limitation, the interconnect members 50 may be embodied as coil springs as shown in FIG. 3 projecting from a surface 40S. The surface 40S in turn is arranged along a plane P1 that is parallel to a plane P2 of a surface 30S of the interconnect board 30. The interconnect members 50 may each have a distal end 51. When the cover plate 40 is moved in the direction of arrows A toward the pack section 22, the distal end 51 comes into direct contact with the conductive channel 14 and a surface feature 27 thereof, e.g., a boss or other projection of the conductive channel 14, or a recessed surface portion of the conductive channel 14, with the surface feature 27 possibly serving to align and mates with a coil loop formed by the distal end 51 in the coil spring embodiment. This allows the interconnect member 50 to absorb relative motion, with the spring force of the interconnect member 50 providing a desirable normal force to help to maintain good electrical contact between the cover assembly 22C and the pack section 22.

Figure 4A:
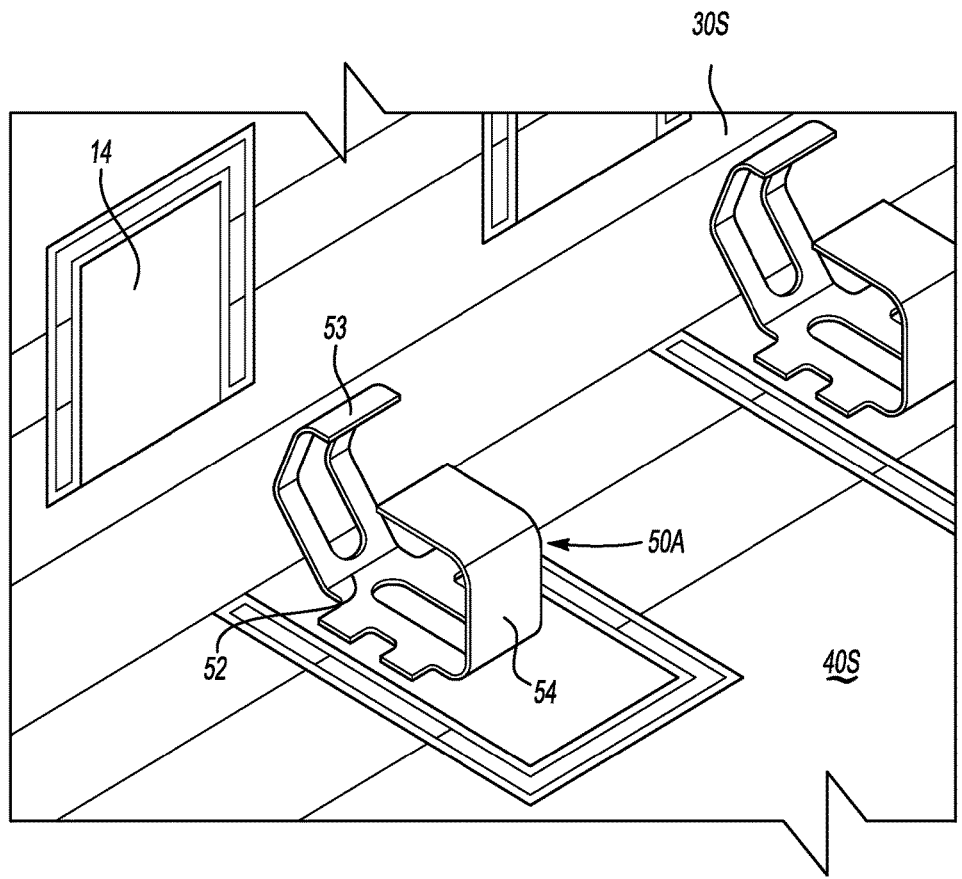
FIG. 4A-D are schematic perspective view illustrations of alternative conductive interconnect members usable with the cover assembly shown in FIG. 2.

FIGS. 4A-D depict alternative embodiments of the coil spring-type interconnect member 50 of FIG. 3. In each example, the variations provide the positive normal force needed for good electrical contact between the interconnect member 50 and the conductive channels 14 while absorbing relative motion of the cover assembly 22C. FIG. 4A shows an interconnect member 50A extending outward from the surface 40S. The interconnect member 50A may have a fixed portion 54 extending orthogonally from the surface 40S, and a hinged portion 52 connected to the fixed portion 54 via a hinge 52. Here, when the cover assembly 22C is brought into contact with the surface 30S of the interconnect board 30, an end 53 of the hinged portion 52 rotates toward the fixed portion 54, thereby absorbing relative motion as noted above.

Figure 4B:
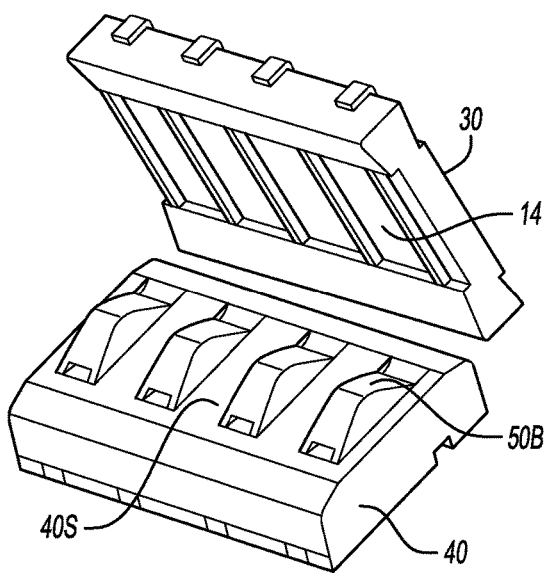
Figure 4C:
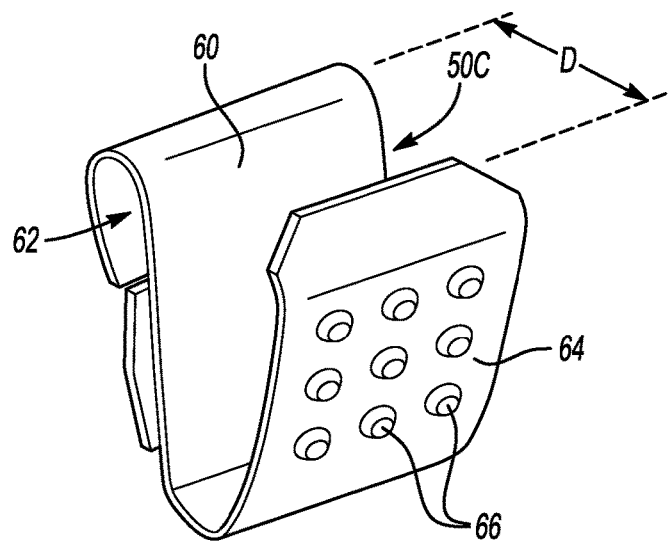

FIG. 4B depicts an embodiment in which an interconnect member 50B is configured as a leaf spring, e.g., with V-shaped projections extending outward from the surface 40S of the cover assembly 22C. Likewise, an interconnect member 50C as shown in FIG. 4C may have opposing legs 60 and 64 separated by a distance D, and forming an alternative leaf spring to the configuration of FIG. 4B. A compressive force urging the legs 60 and 64 toward each other helps absorb the relative motion of the cover assembly 22C and the pack section 22, with knurls 66 in the form of raised bumps or localized high friction areas provide good electrical contact with the conductive channels 14 when the cover assembly 22C is clamped into place on the pack section 22 of FIG. 1 or 2.

Figure 4D:
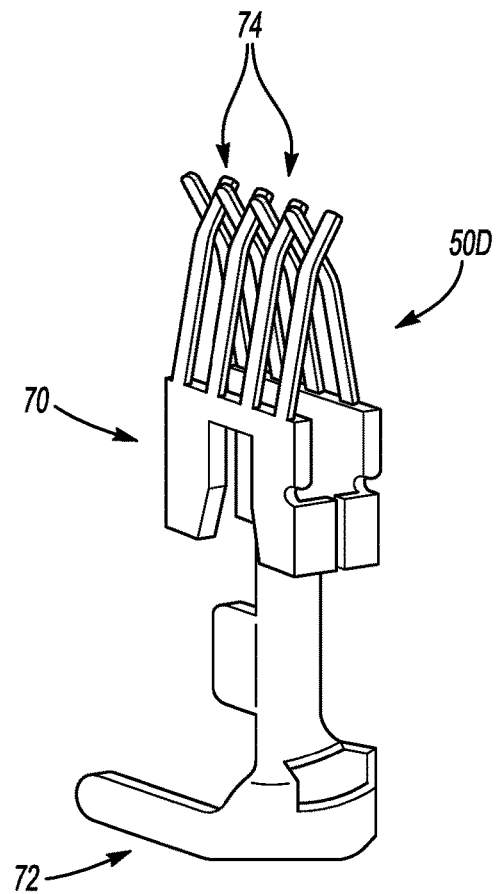

An interconnect member 50D as shown in FIG. 4D may be used as an alternative to the leaf spring embodiments of FIGS. 4B and 4C. The interconnect member 50D may be an electrical connector, such as the non-limiting example embodiment that is shown. In the depicted embodiment, the interconnect member 50D has a clamping end 70 with opposable jaws 74, with the jaws 74 clamping onto the cell tabs 13E to ensure good electrical contact. Wires (not shown) connected to the cover plate 40 may be crimped to the interconnect member 50D and the cover plate 40 at a crimping end 72, possibly soldered to the crimping end 72, or joined using a conductive adhesive. As with the embodiment of FIG. 4D, other coil spring and leaf spring embodiments of FIGS. 4A-C may similarly use conductive adhesive at interfaces to the conductive channels 14. While the embodiment of FIG. 4D is possibly less resilient and more labor intensive than those depicted in FIGS. 4A-C, particularly in terms of relative ease of alignment with the pack section 22, the interconnect member 50D is an embodiment that may be easily sourced and adapted for use in the present cover assembly 22C.

Figure 2:
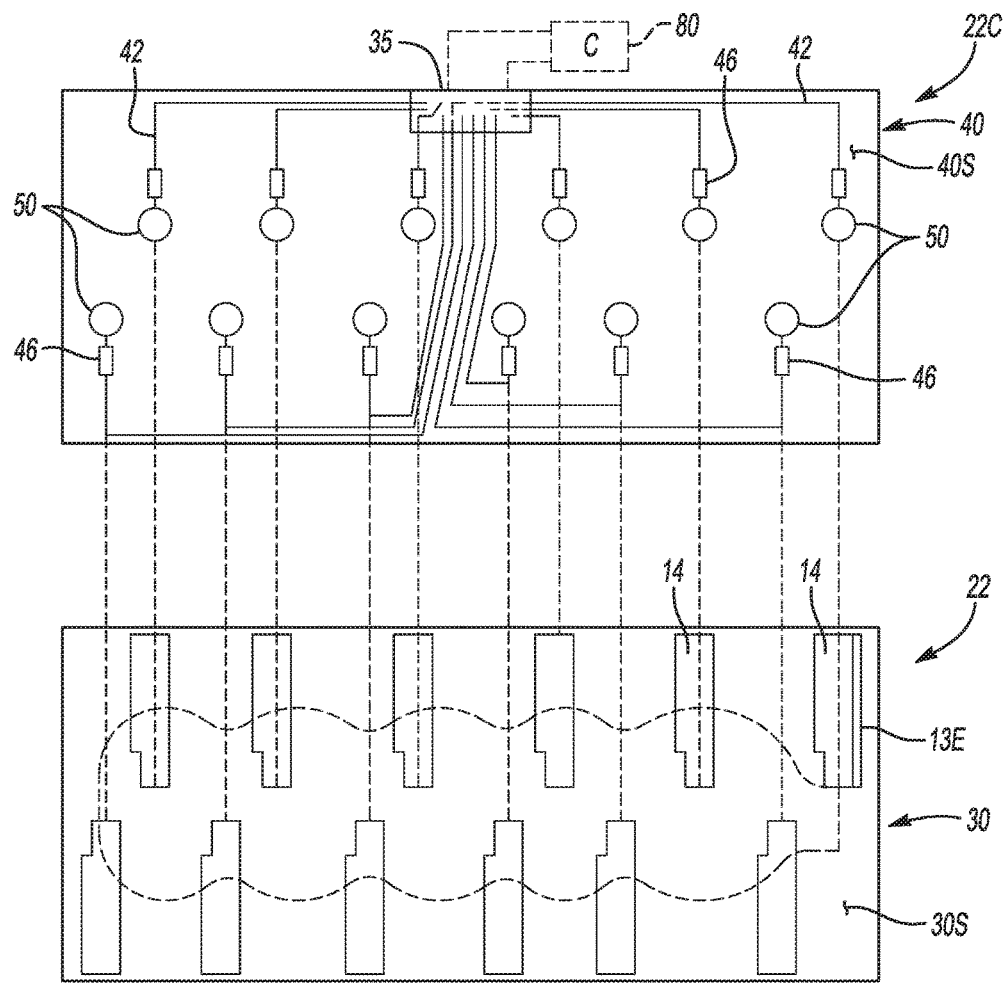
FIG. 2 is a schematic plan view illustration of a serviceable cover assembly and a pack section usable as part of the electrical system of FIG. 1.

As will be readily appreciated by those possessing ordinary skill in the art, battery packs typically rivet a cell sense control board to the rigid interconnect board, e.g., the interconnect board 30 of FIG. 2. Thereafter, the individual cell tabs 13E are ultrasonically welded to the conductive channels 14. i.e., to the side walls 14W as shown in the example U-shaped embodiment of FIG. 3. As a result, too much or too little vibration energy and associated heat may affect the structural integrity of such previously formed rivets and other surrounding structure such as weld pads or the cell tabs 13E inside of a given battery cell. However, cell sense structure is integrated into the cover assembly 22C, and thus forces and heat imparted during ultrasonic welding of the cell tabs 13E have no effect on the structural integrity of such rivets. This, coupled with the potential cost benefits enabled by integration of circuit protection components into the disposable or replaceable cover assembly 22C, are a few possible advantages of the present disclosure as set forth above.

While the best modes for carrying out the disclosure have been described in detail, those familiar with the art to which this disclosure relates will recognize various alternative designs and embodiments for practicing the disclosure within the scope of the appended claims.

What is claimed is:

1. A battery module comprising:
   a pack section having an interconnect board, a plurality of conductive channels each forming an elongated U-shaped or L-shaped bus bar, and a plurality of battery cells each having at least one electrode cell tab extending orthogonally through the interconnect board, each of the battery cells being disposed behind the interconnect board, the at least one electrode cell tab joined to a corresponding one of the conductive channels; and
   a cover assembly connectable to the pack section, and having a cover plate and a plurality of conductive interconnect members, a plurality of electrical fuses, and a plurality of sense lines built into or integral with the cover plate, the conductive interconnect members protruding orthogonally outward from the cover plate and forming part of an electrical circuit between the conductive channels of the pack section and the fuses and sense lines of the cover plate when the cover assembly is connected to the pack section.

2. The battery module of claim 1, wherein the conductive interconnect member is a coil spring.

3. The battery module of claim 2, wherein the coil spring has a distal end forming a coil loop, the conductive channels form the elongated U-shaped bus bar in which a floor is flanked by a pair of side walls, the floor defines a surface feature that aligns and mates with the coil loop, and the at least one electrode cell tab is ultrasonically welded to one of the pair of side walls.

4. The battery module of claim 1, wherein the conductive interconnect member is a leaf spring.

5. The battery module of claim 4, wherein the leaf spring includes a surface feature that contacts a surface of the conductive channel when the cover assembly is connected to the pack section.

6. The battery module of claim 1, wherein the conductive interconnect member includes an electrical connector with a clampable end and a crimpable end.

7. The battery module of claim 1, wherein the cover assembly includes a multi-pin electrical connector forming a terminal end of the sense lines.

8. The battery module of claim 1, wherein the fuses have a current rating in a range of about 100 milliamps to 5 amps.

9. An electrical system comprising:
   a battery module having a pack section and a cover assembly connected to the pack section;
   a direct current (DC) voltage bus; and
   at least one high-voltage component connected to the battery module via the DC voltage bus;
   wherein the pack section includes an interconnect board, a plurality of conductive channels each forming an elongated U-shape or L-shaped bus bar, and a plurality of battery cells each having at least one electrode cell tab extending orthogonally through the interconnect board, each of the battery cells being disposed behind the interconnect board, the at least one electrode cell tab joined to a corresponding one of the conductive channels, and wherein the cover assembly includes a cover plate and a plurality of conductive interconnect members, a plurality of electrical fuses, and a plurality of sense lines built into or integral with the cover plate, the conductive interconnect members protruding orthogonally outward from the cover plate and forming part of an electrical circuit between the conductive channels of the pack section and the fuses and sense lines of the cover plate when the cover assembly is connected to the pack section.

10. The electrical system of claim 9, wherein the conductive interconnect member is a coil spring.

11. The electrical system of claim 10, wherein the coil spring has a distal end forming a coil loop, the conductive channels form the elongated U-shaped bus bar in which a floor is flanked by a pair of side walls, the floor defines a surface feature that aligns and mates with the coil loop, and the at least one electrode cell tab is ultrasonically welded to one of the pair of side walls.

12. The electrical system of claim 9, wherein the conductive interconnect member is a leaf spring.

13. The electrical system of claim 12, wherein the leaf spring includes a surface feature that contacts a surface of the conductive channel when the cover assembly is connected to the pack section.

14. The electrical system of claim 9, wherein the conductive interconnect member includes an electrical connector with a clampable end and a crimpable end.

15. The electrical system of claim 14, wherein the crimpable end is soldered to the cover plate.

16. The electrical system of claim 9, wherein the cover assembly includes a multi-pin electrical connector forming a terminal end of the sense lines.

17. The electrical system of claim 9, wherein the fuses have a current rating in a range of about 100 milliamps to 5 amps.

18. The electrical system of claim 9, wherein the high-voltage component is a power inverter module, the electrical system further comprising an electric machine connected to the battery module via the power inverter module.

19. The electrical system of claim 18, wherein the electric machine is connected to an input member of a transmission having an output member connected to a load.

20. The electrical system of claim 19, wherein the electrical system is part of a motor vehicle having a set of road wheels as the load.

* * * * *